United States Patent
Kirla

(10) Patent No.: US 7,149,228 B1
(45) Date of Patent: Dec. 12, 2006

(54) METHOD FOR CHANGING THE ROUTE OF A DATA TRANSFER CONNECTION AND FOR INCREASING THE NUMBER OF CONNECTIONS OVER A DATA TRANSFER LINK

(75) Inventor: Olli Kirla, Helsinki (FI)

(73) Assignee: Nokia Corporation, Espoo (FI)

( * ) Notice: Subject to any disclaimer, the term of this patent is extended or adjusted under 35 U.S.C. 154(b) by 981 days.

(21) Appl. No.: 10/089,946

(22) PCT Filed: Oct. 9, 2000

(86) PCT No.: PCT/FI00/00869

§ 371 (c)(1),
(2), (4) Date: May 14, 2002

(87) PCT Pub. No.: WO01/28268

PCT Pub. Date: Apr. 19, 2001

(30) Foreign Application Priority Data

Oct. 8, 1999 (FI) ................................ 19992166

(51) Int. Cl.
*H04J 3/16* (2006.01)
*H04J 3/22* (2006.01)

(52) U.S. Cl. .................. 370/465; 370/468; 370/229

(58) Field of Classification Search ............... 370/465, 370/229, 235, 331
See application file for complete search history.

(56) References Cited

U.S. PATENT DOCUMENTS

| | | | |
|---|---|---|---|
| 5,546,390 A | 8/1996 | Stone | 370/60 |
| 6,646,993 B1 * | 11/2003 | Davies et al. | 370/252 |
| 6,865,163 B1 * | 3/2005 | Bergenwall et al. | 370/288 |
| 6,868,257 B1 * | 3/2005 | Holma | 455/63.1 |
| 2002/0089976 A1 * | 7/2002 | Luddy | 370/358 |
| 2002/0090000 A1 * | 7/2002 | Luddy | 370/465 |

FOREIGN PATENT DOCUMENTS

| | | |
|---|---|---|
| FI | 105436 B | 8/2000 |
| WO | WO 9803030 | 1/1998 |
| WO | WO 98/36589 | 8/1998 |
| WO | WO 98/48580 | 10/1998 |
| WO | WO 9911079 | 3/1999 |
| WO | WO 99/40743 | 8/1999 |
| WO | WO 9939459 | 8/1999 |

* cited by examiner

*Primary Examiner*—Chirag Shah
(74) *Attorney, Agent, or Firm*—Cohen, Pontani, Lieberman & Pavane

(57) ABSTRACT

A method for changing a data transfer rate on a communications connection, wherein information is processed using a processing method at a first point of the communications connection. The processed information is transferred to a second point of the communications connection where the information is restored using a restoration method that corresponds with the processing method. The processing method is selected from a given set of processing methods and the restoration method is selected from a given set of restorations methods. The processing method is selected so that the processed information is produced at a rate that is less than or equal to the lowest of the data transfer rates before and after the change in the data transfer rate.

25 Claims, 9 Drawing Sheets

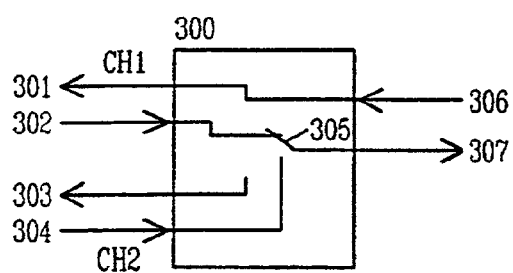
FIG. 3a
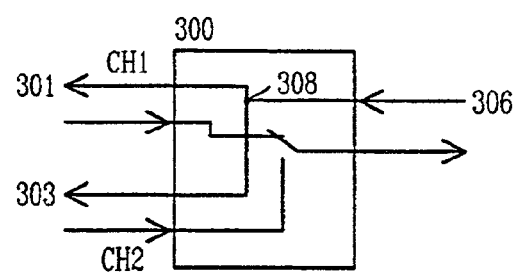
FIG. 3b
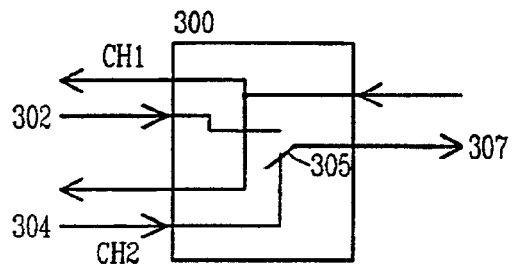
FIG. 3c
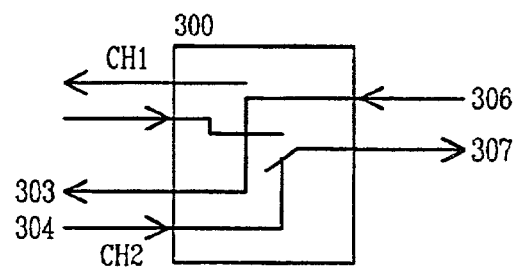
FIG. 3d
FIG. 3 PRIOR ART

METHOD FOR CHANGING THE ROUTE OF A DATA TRANSFER CONNECTION AND FOR INCREASING THE NUMBER OF CONNECTIONS OVER A DATA TRANSFER LINK

PRIORITY CLAIM

This is a national stage of PCT application No. PCT/FI00/00869, filed on Oct. 9, 2000. Priority is claimed on that application, and on patent application No. 19992166 filed in Finland on Oct. 8, 1999.

FIELD OF THE INVENTION

The invention relates in general to changing the route of a communications connection and increasing the number of connections over a communications link. In particular the invention relates to selecting the method used for processing the information transferred in conjunction with a handover in a mobile communications network.

BACKGROUND OF THE INVENTION

In mobile communications networks there often occur situations in which the route of a communications connection must be changed e.g. because the location of the mobile station changes. The communications connections of a mobile station, most often calls, are usually routed via the nearest base station. When the mobile station moves and the distance to the serving base station grows, resulting e.g. in the weakening of the radio signal, the mobile network carries out a handover, i.e. the communications connections of the mobile station are switched over to a new, usually the nearest, base station.

For a handover to be successful the target base station needs to have free channels both over the air interface between the mobile station and base station and from the base station to the network. In addition, the data transfer rates of these channels must be suitable. Either the transfer rates must be the same as in the original base station or the mobile station and target base station need to negotiate new speech coding and other coding methods to be subsequently used in the handling of this particular connection in the mobile network. For example, if the target base station is able to set up a connection on a channel the channel rate of which is lower than the original, the mobile station and mobile network need to find a common speech coding method compatible with the lower transfer capacity. Mobile stations, for instance, may use two different speech coding methods which produce data streams that require different transfer rates. The task of the speech coding method is to pack the digitized speech that requires a 64-kbps transfer rate into a format that requires a transfer rate not higher than 13 kbps in the GSM network (Global System for Mobile communications).

In mobile networks according to the prior art there are two kinds of channel over the air interface: half rate (HR) channels and full rate (FR) channels. These terms always refer to the channel rate of the air interface. A base station may support either half rate or full rate channels or both. The capacity of a channel over the air interface is used, apart from the transfer of encoded information, such as e.g. speech, also for channel coding. The purpose of channel coding is to improve the quality of the data transferred over the air interface. For example, certain errors in the transfer can be corrected by means of channel coding and the altered data need not be re-transmitted. However, channel coding adds to the data that must be transferred and, for example, the more there is noise, the more heavier the channel coding that must be used and the greater the part of the transfer capacity that is used for the transfer of channel coding information. Speech coding methods are often classified as compatible with either half rate or full rate channels, depending on the transfer rate required by the transfer over the air interface of encoded speech produced by them.

FIG. 1 illustrates a handover according to the prior art in a GSM network. A mobile station (MS) 101 is connected over the air interface to a base station (BTS1) 102. Channel coding is a function between the mobile station and base station, and it is denoted by an arrow in the lower part of FIG. 1. The base station is connected through a fixed line to a base station controller (BSC) 103, which also controls a second base station (BTS2) 104. The base station controller is connected through a network-side transcoder and rate adaptation unit (TRAU) 105 to a mobile switching center (MSC) 106. GSM speech coding is a function between the terminal and the network-side TRAU, and it is denoted by an arrow in the lower part of FIG. 1. Encoded speech is transferred over a connection from the base station via a base station controller to the TRAU in TRAU frames at a speed which usually is 8 or 16 kbps. This transfer between the base station and TRAU is called base station transmission. Between the TRAU and mobile switching center, speech travels in the same format that is used in fixed telephone networks, and the transfer rate is 64 kbps.

In the situation depicted in FIG. 1 the call or other communications connection uses channel CH1 in base station 102. The mobile network decides to carry out a handover, and intends to move the communications connection over to channel CH2 in base station 104. The switching function 107 in the base station controller shown in FIG. 1 is responsible for carrying out the handover of the connection to the new base station. FIG. 1 illustrates an intra-BSC, inter-cell handover. Intra-cell handovers are also possible, as well as inter-BSC or inter-MSC handovers. In this context we will concentrate on intra-BSC handovers which take place not only when the location of a mobile station changes but also when a half rate channel is to be changed into a full rate channel if, for example, the quality of the radio path is so poor that satisfactory audio quality cannot be guaranteed using channel coding and speech coding methods compatible with a half rate channel. In an intra-cell handover the channel speed may also be changed from full rate to half rate if allowed by the radio path quality and the base station cell lacks free channels.

In mobile networks according to the prior art, a change in the channel rate of a channel over the air interface will result in a change in the speech coding method and possibly in the channel rate of base station transmission, when conventional speech coding methods are used. This is due to the fact that half rate speech coding methods do not support a full rate air interface, and full rate speech coding methods do not support a half rate air interface. In GSM networks, full rate and enhanced full rate (EFR) speech coding methods are usually accompanied by 16-kbps base station transmission, and half rate speech coding methods are usually accompanied by 8-kbps base station transmission. It is also possible to use e.g. 16-kbps base station transmission with half rate speech coding methods, but then some of the transmission capacity will be wasted.

In conventional speech coding methods which produce speech that is coded at a constant rate the speech quality strongly depends on the radio path quality of the connection.

When using conventional speech coding methods, the ratio of speech coding and channel coding in the transfer rate over the air interface stays constant all the time. Thus, in noisy conditions the channel coding is not necessarily able to eliminate all spurious effects, which causes uncontrollable degradation in speech quality.

To optimize the speech quality and the transfer capacity in use in a mobile network it is possible to use an adaptive multirate (AMR) system according to the prior art. The AMR system uses a variable-rate speech coding method which is hereinafter called the AMR speech coding method. The term AMR system refers to the whole AMR concept which comprises the measurement of the radio path quality and the selection of a suitable AMR speech coding method and channel coding method.

As the AMR system uses a variable-rate speech coding method, it is possible to vary the ratio of the transfer rates required by the channel coding and speech coding within a framework of a certain air interface channel rate. In the AMR system it is possible in noisy conditions to use a lower speech coding rate and increase the ratio of channel coding in the transfer capacity of a channel over the air interface. When the speech coding method is changed into one that produces encoded speech at a lower rate, the speech quality suffers to a certain extent. However, the speech coding methods are usually designed in such a manner that they produce the best possible speech quality for the transfer rate available. So, by choosing a slower speech coding method and channel coding that better eliminates the degradation of speech quality caused by the air interface it is possible to reduce the speech quality in a controlled manner.

The AMR system according to the prior art also involves air interface channel rate change, not only the optimization of speech and channel coding within the framework of a certain channel rate. Such channel rate change is carried out using the handover described above. The air interface channel rate is changed by means of an intra-cell handover, for example.

FIG. 2 illustrates the operating principle of the AMR system. Like elements in the figures are denoted by like reference designators. The AMR system implementation involves a mobile station 101, base station 102, base station controller 103 and a network-side speech coding unit 105 (i.e. TRAU). In FIG. 2 the AMR speech coding method is represented as a speech encoder 201 in the mobile station and speech coding unit, and as a speech decoder 202 in the same network elements.

In FIG. 2, the horizontal lines coming into and going out of a given block are the block's input and output data streams processed by the block. They do not, however, have any effect on the block's mode of operation. Lines arriving at blocks from above or below mean that the information conveyed through a particular connection does have an effect on the block's operation. A connection carrying speech information is denoted by a thick continuous line in FIG. 2. A downlink connection is shown in the upper part of FIG. 2 and an uplink connection in the lower part of FIG. 2. Intra-channel signalling associated with a downlink connection is denoted by a thin continuous line and signalling associated with an uplink connection is denoted by a thin broken line in FIG. 2.

In addition to blocks 201 and 202 associated with speech coding the mobile station 101 comprises a channel encoder 203 and channel decoder 204 associated with channel coding, and a downlink (DL) connection quality measurement block 205. The base station comprises a channel encoder 203 and decoder 204 as well as an uplink (UL) connection quality measurement block 206. In addition to these, the base station includes a downlink speech codec selection control block 207 and an uplink speech codec selection control block 208. The downlink quality measurement results are sent from the mobile station's block 205 to control block 207, and the uplink quality measurement results are sent from the measurement block 206 to the control block 208 within the base station.

The base station controller comprises two switching fields 209 and 210 through which the connections travel from the base station to the speech coding unit and in the reverse direction. These switching fields belong to the switching function 107. The speech coding unit comprises a speech encoder 201 and decoder 202 associated with speech coding. Selection of downlink speech and channel coding methods is realized as follows. Downlink connection quality is measured in block 205 and the results are delivered to control block 207. The control block informs the speech encoder 201 in the speech coding unit 105 about the speech coding method selected, and the speech encoder will use the selected method to encode the downlink connection. The channel encoder 203 in the base station is informed about the selected speech codec and selects channel coding accordingly. The channel decoder 204 in the mobile station receives signalling information about the channel coding used and can on the basis of this information carry out channel decoding. Also the speech decoder 202 in the mobile station receives signalling information about the speech coding method used.

Speech and channel coding methods for an uplink connection are selected in a similar fashion. The selected speech coding method is signalled via a downlink connection from the control block 208 to the mobile station. The speech encoder 201 and channel encoder 203 in the mobile station receive the information and will use the selected coding methods. Information about the speech coding method used is also sent to the channel decoder 204 in the base station and to the speech decoder 202 in the speech coding unit. In the AMR system, the speech coding method and channel coding method can be changed at 40-ms intervals, i.e. at intervals of two 20-ms speech frames.

At its simplest the switching function 107 in the base station controller in accordance with the prior art is a change-over switch between the original and target channels. In that case, a two-way data stream is switched at once from the original channel to the target channel. The switching moment must be chosen such that the break in the communications connection is as short as possible. Usually the change-over is carried out when the mobile station has been successfully handed over to the target channel in the target base station. Information about a successful change comes in a signalling message. Switching function has to be used always when the air interface channel rate and, consequently, the speech processing method are changed in conjunction with a handover. The network-side speech coding unit 105 changes speech coding methods synchronized with the mobile station at the switching moment.

In certain situations the downlink data stream to the terminal may be branched. In that case, the downlink data stream may during a handover travel to both the original channel and the target channel simultaneously. A corresponding operation on an uplink data stream coming to the base station would be summing, but two encoded audio streams cannot be summed. The switching function must always be used in a handover for an uplink data stream when the data stream is comprised of encoded speech.

FIG. 3 illustrates the operation of the branching/switching function in a base station controller in accordance with the prior art. The uplink and downlink connections are shown as separate one-way connections in the figure. The figure shows four different phases of handover, and like elements are denoted by like reference designators in these subfigures. FIG. 3a illustrates the situation in the beginning of a handover. The base station controller's switching/branching block 300 receives from the speech coding unit a downlink data stream 307 which travels through the block 300 as such to the original base station BTS1 through a downlink connection 301. From the original base station on channel CH1 an uplink data stream 302 travels via switch 305 to the speech coding unit of the mobile network through connection 307 and from there via a mobile switching center 106 to the other end of the connection. In the initial state of the handover no data is carried onto the channel CH2 of the target base station BTS2 through the downlink connection 303 or uplink connection 304.

The base station controller decides to perform a handover and when the target base station channel CH2 has been activated the switching/branching block enters the first intermediate state according to FIG. 3b. The downlink data stream 306 coming from the speech coding unit is branched at point 308 so as to travel both to the original base station through connection 301 and to the target base station through connection 303. The uplink connection still travels via the original base station. The second intermediate state shown in FIG. 3c follows when the mobile station has tuned to channel CH2 of the target base station, in which state the uplink data stream is switched to the target base station by means of switch 305. The downlink data stream is still directed to both base stations. When a signalling message indicating a successful handover has been received, the block enters the final state shown in FIG. 3d, in which state the branching of the downlink data stream at point 308 has been removed. The data streams between the mobile station and the other terminal of the connection travel only via the target base station.

A problem with handovers according to the prior art is that the use of the switching function in a downlink connection impairs the quality of the connection, say the speech quality, as it introduces a break in the downlink connection at the switching moment. The length of the break depends on the transmission delay between the switching function at the base station controller and the mobile station. Furthermore, if synchronization of the mobile station to the new channel is delayed e.g. because of interference in the radio interface or if the handover fails and the mobile station has to in to the original channel, the break may be annoyingly long.

When using the branching/switching function, the quality of the downlink connection stays better. With conventional speech coding methods, branching may be used in handovers in which the speech coding method is not changed. In that case, the data stream traveling through both the original and the target base station is processed in the speech coding unit using the same speech codec. When using conventional speech codecs, the speech coding method need not be changed in conjunction with a handover, if the air interface channel rate is not changed in the handover.

With conventional speech coding methods the switching function is needed at least in handovers in which the air interface channel rate changes between half rate and full rate. Handovers, in which the air interface channel rate changes, occur in situations where e.g. the target base station does not support the channel rate of the call or will not let the call have the channel rate in question, in order to maximize the number of calls, for example.

The problem, when using the AMR system, is that air interface interference is compensated for by changing, for example, a half rate air interface channel into a full rate channel. This results in an increase in the number of handovers in which the air interface channel rate changes. Since the speech coding methods in the AMR system, too, are categorized as compatible with half and full rate air interface channel rates, the speech coding method possibly has to be changed in conjunction with a handover into a method not compatible with the original one. Thus the switching function must be used, which degrades the speech quality.

For some of the AMR speech codecs the base station transmission channel rate of 8 kbps is not enough whereas all the conventional half rate speech codecs are compatible with this rate. If, for example, a call is begun using a half rate speech codec, which requires a base station transmission rate of 16 kbps, it is possible at some point in the call to end up in a situation in which the speech quality would be guaranteed by a combination of channel coding and speech coding for which an 8 kbps base station transmission would be enough. The problem is that base station capacity is at that moment unnecessarily allocated to the connection in question and that changing the transmission capacity of a circuit-switched connection often results in a break in the connection.

So, the use of the AMR system may lead to a situation in which the number of breaks in the connection grows larger. It has been suggested that the number of handovers carried out at the AMR system's initiative be limited to about two in a minute per connection, lest the connection be broken too often. However, limiting the number of handovers requires additional logic on the network side and results in that the capabilities of the AMR system as regards optimization of connection quality cannot be fully exploited.

SUMMARY OF THE INVENTION

The object of the invention is to provide a method for changing the data transfer rate of a communications connection, over which information processed with a processing method is transferred, either by itself or when the route of the communications connection changes. It is advantageous that the communications connection functions uninterrupted.

The object of the invention is accomplished by a method in which, prior to making changes in the transfer rate of the communications connection, the method used in the processing of the information transferred is chosen such that it produces processed information at a rate which is not higher than the lowest rate at which the information processed is transferred.

A method according to the invention for changing a data transfer rate used in a part of a communications connection, in the method:
  a first processing method is chosen from a pre-determined set of processing methods,
  a first restoration method is chosen from a pre-determined set of restoration methods,
  information is processed using said first processing method at a first point of the communications connection,
  the information is transferred from the first point to a second point of the communications connection, data transfer rates used between the first point and the second point constituting a first set of data transfer rates, the information is restored using said first restoration method at the second point, at least one data transfer rate used between the first point and the second point is changed, the data transfer rates used after changing the at least one data transfer rate between the first point and the second point constituting a second set of data transfer rates, wherein the method comprises:
  defining a set of compatible processing methods, each compatible processing method belonging to said pre-determined set of processing methods, having an output information rate that is lower than or equal to the lowest data transfer rate of said first set of data transfer rates and said second set of data transfer rates, and corresponding with a restoration method that belongs to said pre-determined set of restoration methods,
  selecting, prior to changing the at least one data transfer rate, a second processing method from the set of compatible processing methods, and
  replacing the first processing method with the second processing method and processing the information using the second processing method.

A system according to the invention for changing a data transfer rate used in a part of a communication connection, at least one part of said communication connection being a radio path, the system comprising:
  means for determining data transfer rates being used in parts of the communications connection, the data transfer rates being used in said parts constituting a first set of data transfer rates,
  means for determining data transfer rates to be used next in said parts of the communications connection, the data transfer rates to be used next in said parts constituting a second set of data transfer rates,
  processing means capable of performing information processing according to such a processing method that belongs to a pre-determined set of processing methods,
  restoration means capable of performing information restoration according to such a restoration method that belongs to a pre-determined set of restoration methods,
  first selection means for selecting a first processing method from the pre-determined set of processing methods in accordance with properties of an air interface associated with the radio path and for selecting a first restoration method that corresponds with the first processing method,
  conveying means capable of conveying information about such a processing method that belongs to the pre-determined set of processing methods and information about such a restoration method that belongs to the pre-determined set of restoration methods to communications equipment on a route of the communications connection, wherein the system further comprises:
  means for defining a set of compatible processing methods, each compatible processing method belonging to said pre-determined set of processing methods, having an output information rate that is lower than or equal to the lowest data transfer rate of said first set of data transfer rates and said second set of data transfer rates, and corresponding with a restoration method that belongs to said pre-determined set of restoration methods,
  second selection means for selecting, prior to a change from the first set of data transfer rates to a second set of data transfer rates, a second processing method from the set of compatible processing methods to be used by said communications equipment and for selecting a second restoration method, the second restoration method corresponding with the second processing method.

A system according to the invention for changing a data transfer rate used in a part of a communication connection, at least one part of said communication connection being a radio path, the system comprising:
  means for determining data transfer rates being used in parts of the communications connection, the data transfer rates being used in said parts constituting a first set of data transfer rates,
  means for determining data transfer rates to be used next in said parts of the communications connection, the data transfer rates to be used next in said parts constituting a second set of data transfer rates,
  processing means capable of performing information processing according to such a processing method that belongs to a pre-determined set of processing methods,
  restoration means capable of performing information restoration according to such a restoration method that belongs to a pre-determined set of restoration methods,
  first selection means for selecting a first processing method from the pre-determined set of processing methods in accordance with properties of an air interface associated with the radio path and for selecting a first restoration method that corresponds with the first processing method,
  conveying means capable of conveying information about such a processing method that belongs to the pre-determined set of processing methods and information about such a restoration method that belongs to the pre-determined set of restoration methods to communications equipment on a route of the communications connection, wherein the system further comprises:
  means for defining a set of compatible processing methods, each compatible processing method belonging to said pre-determined set of processing methods, having an output information rate that is lower than or equal to the lowest data transfer rate of said first set of data transfer rates and said second set of data transfer rates, and corresponding with a restoration method that belongs to said pre-determined set of restoration methods,
  second selection means for selecting, prior to a change from the first set of data transfer rates to a second set of data transfer rates, a second processing method from the set of compatible processing methods to be used by said communications equipment and for selecting a second restoration method, the second restoration method corresponding with the second processing method.

A base station device according to the invention in a mobile network, which device comprises
  a means for selecting a processing method according to radio path quality, and
  a means for conveying information about the processing method and/or restoration method to be used to other communications equipment, is characterized in that it comprises a means for receiving a command which limits the set of processing method to be taken into use to a certain set and which cancels the selection of the processing means and/or restoration method according to the radio path quality.

The method according to the invention is applicable in a situation in which information may be transferred over a certain communications link at a plurality of transfer rates. These transfer rates are specified in advance and usually they are multiples of a given basic rate. The transfer rate of each communications connection over a communications link is selected in conjunction with the establishment of the connection when a certain data transfer capacity is allocated to the communications connection.

The information transferred is packed or processed using methods which produce processed data at different speeds. The information is processed and transferred in processed form over a portion of a certain communications connection. After that, the information transferred is restored into a form that corresponds to the original as well as possible. When information is processed using lossy processing methods, some of the original information may be lost, so the restoration method will not necessarily produce the original information stream. When using a lossless data compression method, the restored information stream is identical with the original information stream.

In the method according to the invention, processed information may be transferred in consecutive portions of a communications connection at different data transfer rates. When there is need to change the data transfer rate in one or more portions of the communications connection, the processing method selection is limited in the method according to the invention before changing the data transfer rate. The limited processing method selection comprises the processing methods that produce processed information at a rate which is smaller than or equal to the lowest one of the original or new transfer rates used in the different portions of the communications connection. This limiting function guarantees that processed information can be transferred all the time e.g. as quickly as it is produced. If there are other limitations imposed on the processing methods used with the different data transfer rates apart from those based on the transfer rate, these limitations should also be taken into account. Such limitations may be set in international standards concerning the system, for example. In that case, the limited processing method selection comprises only those processing methods which can be used with all the original and new data transfer rates.

In the method according to the invention, the restoration method is selected so as to correspond to the processing method. If not all the restoration methods that belong to the processing method selection limited on the basis of the transfer rate are in use, the corresponding processing methods shall be removed from the limited processing method selection as well. In the description of the invention to follow it is stated that a processing method is compatible with both the original and the target data transfer rates when the processing method belongs to a processing method selection which is limited in accordance with the data transfer rate, restoration methods available and other possible restrictions.

In the method according to the invention, processed information is produced, just before changing the transfer rate of a communications connection, at a rate which is not higher than the lowest one of the original and target transfer rates used for transferring the information processed. If the transfer rate of the communications connection is increased, some of the data transfer capacity reserved for the connection will be left unused after the change of the transfer rate since data will be produced at a rate which is lower than the transfer rate. If the data transfer rate is decreased, the transfer capacity will be completely utilized in the optimal case. The invention does not specify how the possibly unused capacity should be handled. It may be left empty or portions of the data transferred may be copied into it, for example. Neither does the invention specify how the transmitting or receiving device may handle the unused transfer capacity.

One of the advantages of the method according to the invention is that it enables the use of the branching function, discussed in conjunction with the description of the prior art, when changing the route of a communications connection even if the data transfer rates of the old and new route are different. In a handover, for example, the transfer rates may change both in the air interface and base station transmission. In these cases, too, the methods according to the invention allow the use of the branching function. Prior to the changes the information processing method is selected so that it is compatible with both the original and the new data transfer rate. In branching, the route with the higher transfer rate does not utilize the whole data transfer capacity reserved for the connection, and the route with the lower transfer rate utilizes in the optimal case the whole data transfer capacity reserved for the connection. The branching may also be realized just for one transmission direction of the communications connection, in which case only the processing and restoration methods used in that transmission direction must be limited in accordance with the invention. With the branching function in use, the quality of the connection stays good when changing the route of the communications connection.

The method according to the invention can be utilized also for changing the data transfer rate of a communications connection, e.g. when a certain number of connections with a certain transfer rate over a communications link is to be doubled into a number of connections with a transfer rate half of the original rate. The information processing system is changed prior to making the changes. This can be done in a synchronized manner without breaking the communications connection. After that, the data transfer rate of the communications connection may be changed.

One of the advantages of the method according to the invention is that the data transfer elements conveying processed information need not understand the presentation format of the information, for example. Information processed by means of a processing method is transferred on a transmission band reserved for it. A data transfer element at a branching point just needs to know how to divide this transmission band into two parts. This division may be done without knowing the nature of the information carried on the transmission band, provided that the information transferred is placed in the transmission band in a sensible manner, e.g. by talking just a certain part of the transmission band into use. If, for example, the information transferred is placed in transmission frames comprising n transmission fields, then the number of transmission fields reserved for a given connection (1 to n transmission fields in each transmission frame) depends e.g. on the data transfer capacity desired and on the data transfer capacity available. If there is less information to be transferred than the maximum amount according to the data transfer capacity, the information may be placed in only some of the transmission fields of those reserved. In that case a device at a branching point which knows how to handle transmission frames and fields may select for transmission from each transmission frame those fields that contain data to be transferred.

In the method according to the invention, the information processing system used may be e.g. an information compression system and the restoration method may be the method which restores the original information stream from the packed information. Mobile networks commonly use speech compression or speech coding methods. Video compression methods produce encoded information streams at various rates depending on e.g. the refresh rate of the image, how many picture elements there are in the image or how intelligent the compression method is. The method according to the invention also accepts the use of general-purpose information compression methods. An example of a lossless information processing method is a data transfer rate adapter which does not process the original data stream in any other way but restricts the transfer rate e.g. to a rate that corresponds to the data transfer capacity reserved for the connection.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is described more closely in the following, referring to advantageous embodiments of the invention and the accompanying drawings in which FIG. 3 illustrates a branching/switching function according to the prior art in a base station controller.

DETAILED DESCRIPTION OF THE PRESENTLY PREFERRED EMBODIMENTS

Figure 1:
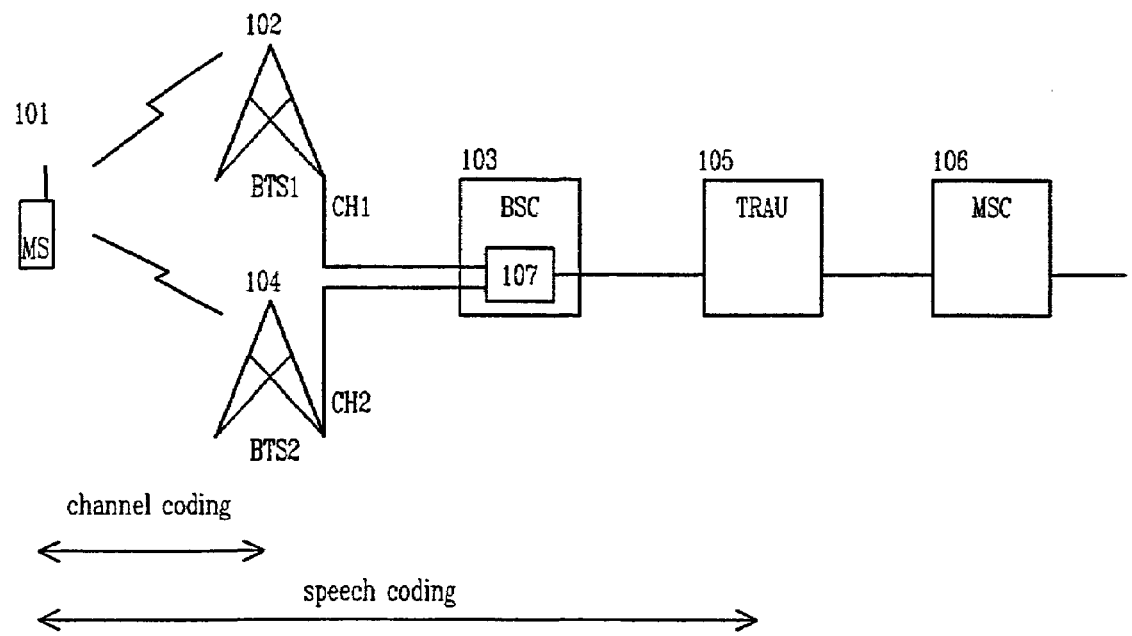
FIG. 1 illustrates a handover according to the prior art.
Figure 2:
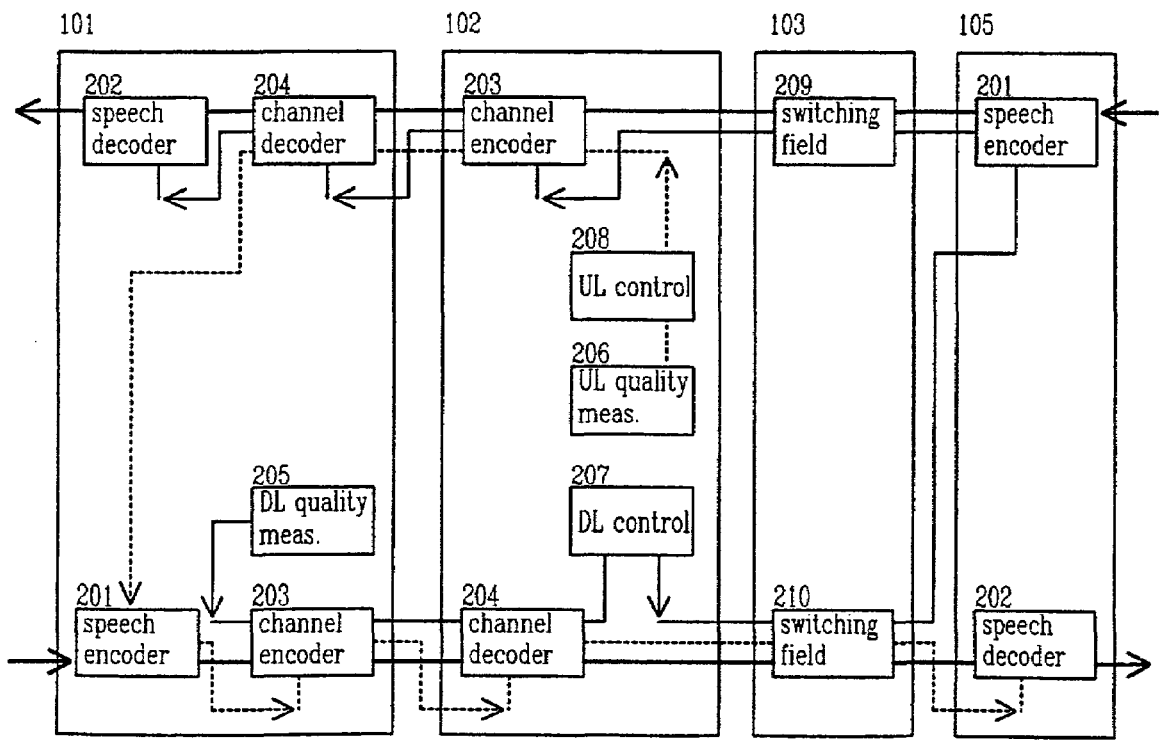
FIG. 2 illustrates an AMR system according to the prior art for optimizing the audio quality and data transfer capacity.

FIGS. 1 to 3 were already discussed above in connection with the description of the prior art.

Figure 4:
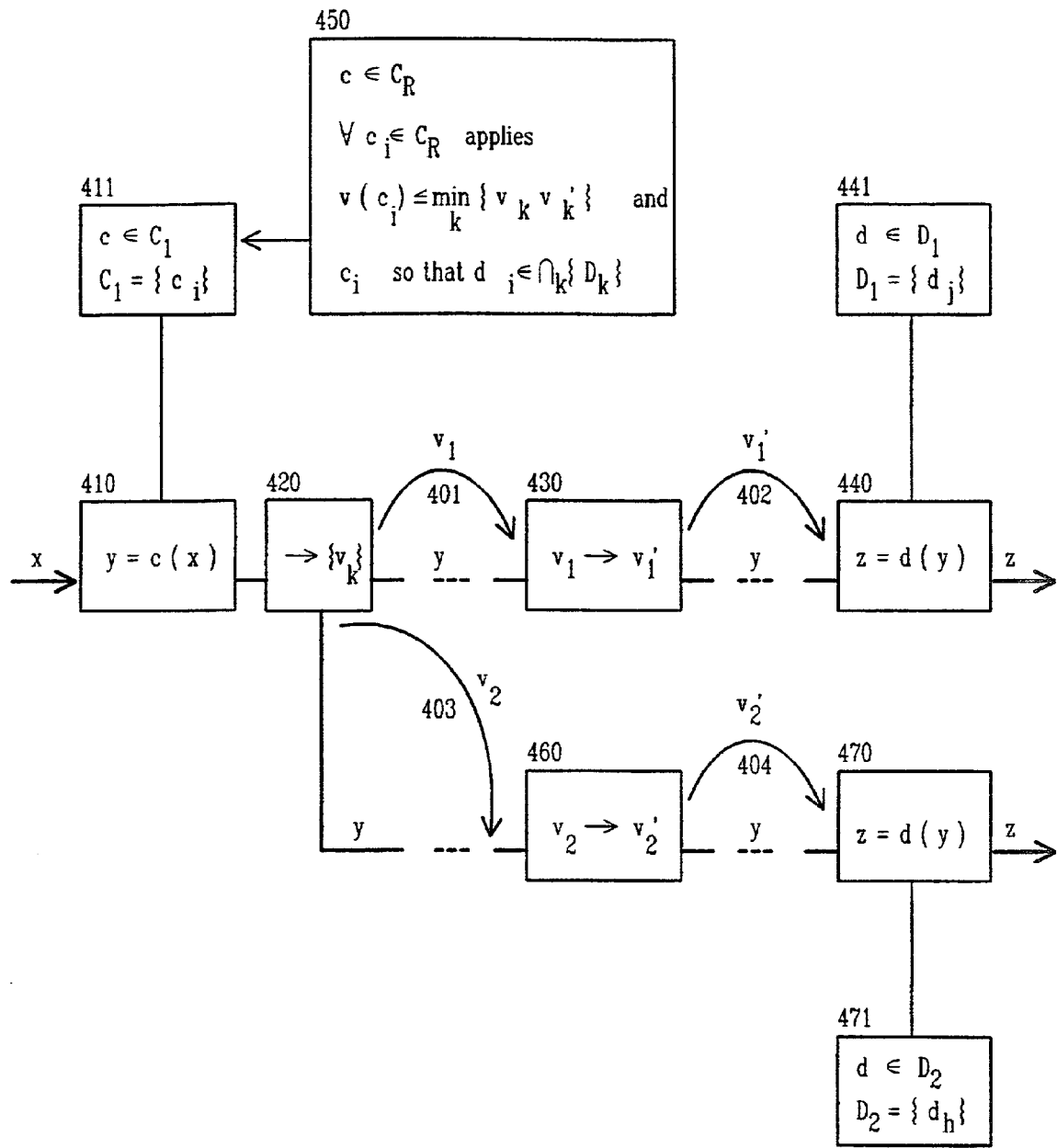
FIG. 4 shows a schematic illustrating the limiting of the processing method selection according to a first advantageous embodiment of the invention.

FIG. 4 illustrates the limiting of the processing method selection according to a first advantageous embodiment of the invention. A one-way communications connection is used as an example in the figure. Information x to be transferred over a communications connection is processed in a processing block 410 using processing method $y=c(x)$. Between the processing block 410 and restoration block 440 information is at first transferred at first data transfer rates, of which FIG. 4 shows by way of example a data transfer rate $v_1$ represented by arrow 401 and a data transfer rate $v_1'$ represented by arrow 402. A rate adaptation block 430 carries out data transfer rate adaptation and e.g. possible changes in the representation of processed information. In the restoration block 440 processed information y is processed using restoration method $z=d(y)=d(c(x))$. If the processing method c is lossless and no errors occurred in the transfer, the resulting information stream z is identical with the original information stream x.

Block 411 shows the processing methods available. The processing method used in the processing block 410 belongs to a certain set of processing methods $C_1=\{c_i\}$, where $i=1, 2, \ldots$. Correspondingly, the restoration method d used in the restoration block 440 belongs to a set $D_1=\{d_j\}$, where $j=1, 2, \ldots$ (block 441). When processed information is transferred, the processing method is selected so that it produces processed information at a rate $v(c)$ which is smaller than or equal to the lowest of the data transfer rates used between the processing block and restoration block. In addition, the restoration method corresponding to the processing method selected has to be available in the restoration block, or otherwise the transferred processed information stream cannot be restored to the original or near original information stream. So, the following restrictions apply to the selection of the processing method at all times in the situation depicted in FIG. 4:

$$c_i \in C_1 \text{ and } v(c_i) \leq \min(v_1, v_1') \text{ and } d_i \in D_1.$$

The data transfer rate in a certain part of the connection between the processing block and restoration block is to be changed so that after the change, information will be transferred at second data transfer rates. FIG. 4 shows by way of example data transfer rates $v_2$ and $v_2'$ represented by arrows 403 and 404. In the situation depicted in FIG. 4, the communications connection is branched in a branching block 420 simultaneously with the changing of the data transfer rate and, in addition, the branching is carried out so that the branched connection ends up in a second restoration block. Arrows 403 and 404 travel through a rate adaptation block 460 to a restoration block 470. It is also possible to branch the communications connection so that both routes still end up in restoration block 440. An example of such branching is the branching of a downlink connection in a handover. It is also possible just to change the data transfer rate in one or more parts of the communications connection without branching.

Before changing the data transfer rate the processing method selection in use is limited. Let us denote this limited selection by the term $C_R$. The processing method used just before changing the data transfer rate and, possibly, branching, has to be one that produces processed information at a rate which is not higher than any of the original or target data transfer rates used for transferring the processed information. In the situation depicted in FIG. 4 this condition may be put as follows: $v(c) \leq \min_k(v_k, v_k')$. In addition, the aforementioned restrictions apply, i.e. the processing method shall be such that the corresponding restoration method belongs to block 441 and possibly also to block 471. So, the processing method $c_i$ must be chosen so that the condition $d_i \in \bigcap_k D_k$ is also met.

These restrictions caused by the data transfer rates and restoration methods available to the processing method selection can in the situation depicted in FIG. 4 be expressed as follows:

$$\forall\, c_i \in C_R \;\; v(c_i) \le \min_k(v_k, v_k') \text{ and } d_i \in \bigcap_k D_k.$$

Moreover, if certain data transfer rates require certain methods, e.g. data transfer rate $v_1$ requires processing methods belonging exclusively to set $R_1$, the processing method used must belong to all the processing method sets R defined for the data transfer rates used for the transfer of the processed information. In the situation depicted in FIG. 4, these restrictions can be expressed as follows:

$$\forall\, c_i \in C_R \;\; v(c_i) \le \min_k(v_k, v_k') \text{ and } d_i \in \bigcap_k D_k \text{ and } c_i \in \bigcap_k \left(\bigcap (R_k, R_k')\right)$$

If processed information is transferred between the processing block and restoration block using a greater number of data transfer rates, such as rates $v_1$, $v_1'$ and $v_1''$ and rates $v_2$, $v_2'$ and $v_2''$, then in the formulas given above rate $v_k''$ has to be added at points where there now is $v_k$ and $v_k'$. Likewise, a set corresponding to each rate, say $R_k''$, has to be added to the formulas.

When the processing method is selected from the limited selection $C_R$, the data transfer rates can be changed without breaking the communications connection. The communications connection may also be branched so that an unbroken processed information stream is transferred on both routes.

FIG. 4 shows in an exemplary manner that the rate adaptation block 430 is connected direct to the restoration block 440 and branching block 420. There may, however, exist several network elements between these blocks or network elements in which these blocks are implemented. In addition, there may be more rate adaptation blocks between the processing block 410 and restoration block 440.

Figure 5:
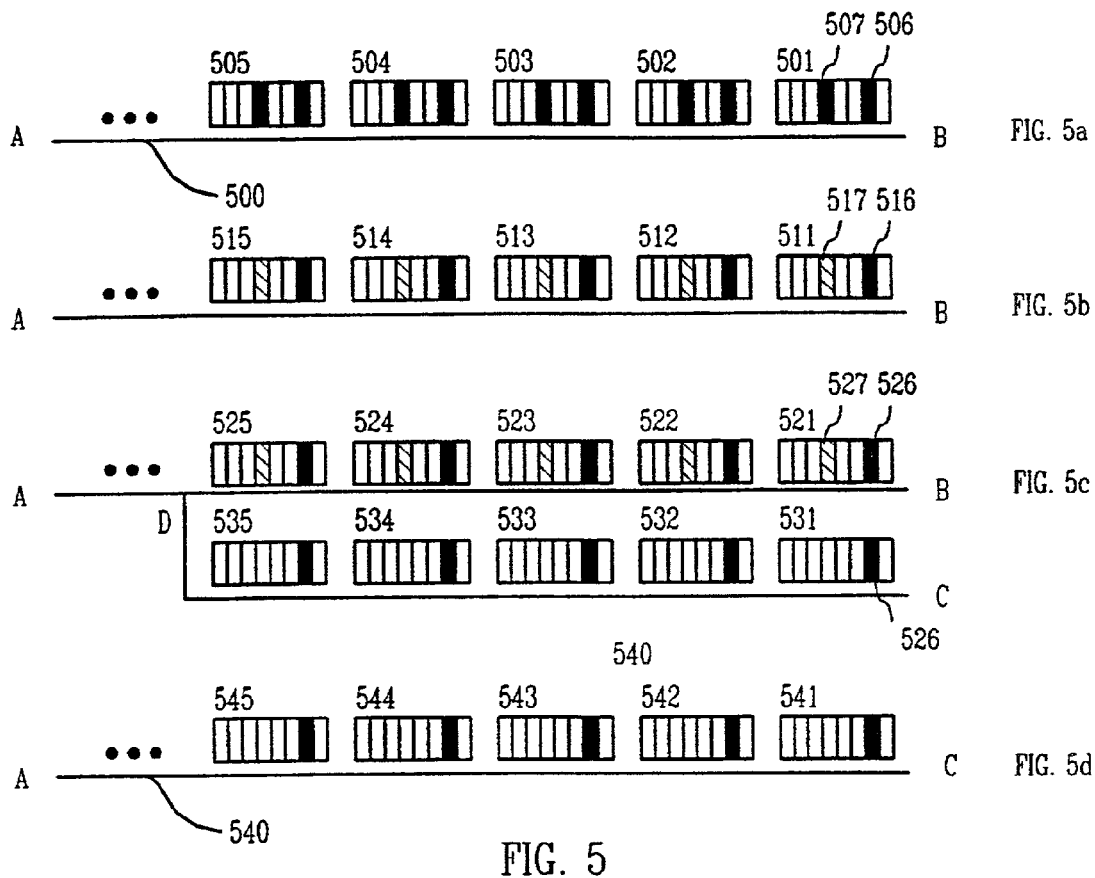
FIG. 5 shows a schematic illustrating the branching of a communications connection according to a second advantageous embodiment of the invention.

FIG. 5 illustrates the branching of a one-way communications connection and changing of the data transfer rate in accordance with a second advantageous embodiment of the invention. The information transferred is shown to be placed in transmission frames which comprise n transmission fields. The transmission frames shown in FIG. 5 comprise eight transmission fields. The term transmission frame in this context refers in general to time slots of synchronous frame structures, discussed e.g. in ITU-T G.704, which time slots usually comprise 8 bits of data.

FIG. 5a shows a sequence of transmission frames 501 to 505, in which information is transferred over a communications link 500 between points A and B. As an example, two transmission fields are reserved in each transmission frame for the connection in question, and the locations of these transmission fields are the same as those of transmission fields 506 and 507 in transmission frame 501. One transmission field corresponds to data transfer rate $v_0$, so at first the data transfer rate of the communications connection is $v_3 = 2v_0$.

At first, information transferred over the communications connection in question may be processed using any processing method compatible with the data transfer rate $v_3$, i.e. which produces processed information at a rate which is not higher than $v_3$. As an example, FIG. 5a depicts a situation in which the whole data transfer capacity reserved for the connection is utilized. In FIG. 5 these transmission fields which are reserved for the connection and contain processed information are coloured black. Three dots mean that the frame stream continues.

The communications connection in question is to be transferred from point B to point C, and the data transfer rate is to be changed to $v_4$ which in this case equals $v_0$. This means that in every transmission frame going to point C, one transmission field is reserved for the connection in question FIG. 5b shows a situation in which the information transferred is processed according to the invention using a processing method supported by both data transfer rate $v_3$ and $v_4$. This information processing method produces information e.g. at rate $v_4$ which is the maximum rate for a processing method compatible with the data transfer rate $v_4$. Since the transfer rate in the situation depicted by FIG. 5b is higher than the rate at which processed information is produced, part of the transfer capacity is left unused. In FIG. 5b, these unused transmission fields are marked with diagonal lines. For example, transmission field 517 in transmission frame 516 is reserved for the communications connection in question but it does not contain information to be transferred.

The communications connection is branched at point D. FIG. 5c illustrates this situation. Processed information is transferred from point A to point D in transmission frames 521 to 525 at rate $v_3$. In transmission frames going to point B, the transmission fields 527 and 526 are reserved for the connection in question, as in the situation depicted in FIG. 5b. Transmission fields that contain processed information are transferred to point C through communications link 540. FIG. 5c shows, as an example, transmission field 526. In transmission frames 531 to 535 going to point C, transmission fields other the those corresponding to transmission field 526 need not contain the same data as the transmission fields in transmission frames 521 to 525. During the branching shown in FIG. 5c it is possible to change the processing method to another processing method supported by both data transfer rate $v_3$ and $v_4$.

In the situation depicted in FIG. 5c the communications equipment at point D need not be able to interpret the contents of the transmission fields in the transmission frames at locations 526 and 527. It suffices that the communications equipment is able to copy certain transmission fields into the transmission fields of the communications link directed to point C. The communications equipment may also comprise a switching function. In that case, the transmission fields associated with the communications link which are directed to points B and C may be located at different points of the transmission fields, and/or the transmission fields in which the transmission fields in question are, may be located at different points in the superframes comprised of transmission frames. The switching function and copying functions are likely to be basic functions in the communications equipment, so that the realization of the method according to the second advantageous embodiment of the invention will not require major changes in the communications equipment.

In the situation depicted in FIG. 5d the communications connection to point B has been removed and the communications connection exists now between points A and C. In the situation depicted in FIG. 5, one transmission field in each transmission frame 541 to 545 has been reserved of the transfer capacity of the communications link 540 for the communications connection in question.

If, when the route of a communications connection changes, the location of a point at which information is processed and/or restored from the processed format, is changed, and information is processed and/or restored in a data transfer device during branching both in the interval D–B and D–C, it has to be made sure that both devices use the same information processing and restoration method. If, for example, information processing and restoration is carried out in a terminal at one end of the communications connection, and the route of the connection is changed so that this endpoint of the connection is not moved to another data transfer device, the information processing and restoration methods will be automatically correct. In FIG. 5 this corresponds to a situation where after points B and C the connection travels through the same data transfer devices.

Figure 6:
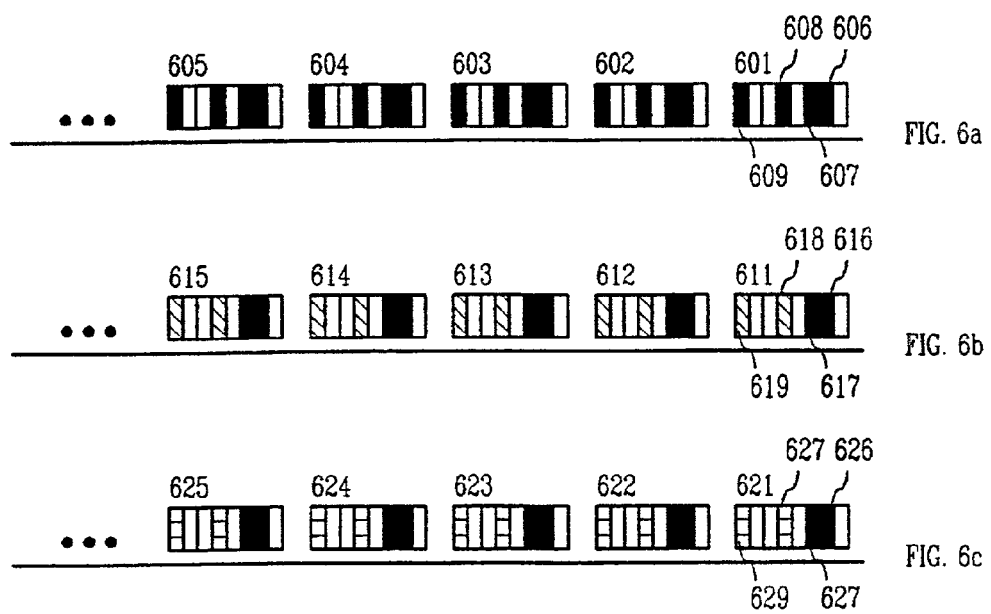
FIG. 6 shows a schematic illustrating the division between different connections of the data transfer capacity of a communications link according to a third advantageous embodiment of the invention.

FIG. 6 illustrates the division of the data transfer capacity of a communications link between different connections in accordance with a third advantageous embodiment of the invention. Like in FIG. 5, the information to be transferred is shown to be placed in transmission frames that contain eight transmission fields, for example. At first, processed information is transferred over the original communications connection in transmission frames at rate vs. This is depicted in FIG. 6a where, as an example, four transmission fields in all the frames 601 to 605 transferred over the communications link have been reserved for the communications connection in question. FIG. 6a shows the transmission fields 606 to 609 reserved for the communications connection i transmission frame 601. In FIG. 6, the transmission fields containing information to be transferred and reserved for the connection in question are coloured black.

Data transfer rate $v_5=4v_0$ is to be changed to data transfer rate $v_6=2v_0$. Here, data transfer rate $v_0$ corresponds to a situation where one transmission field is used in each transmission frame. The reason for changing the data transfer rate may be e.g. that a new communications connection is to be opened over the communications link but all transmission frame fields are reserved for the existing connections. If the communications connection is a two-way connection over the link, the processing methods in both directions must be chosen so as to be compatible with both the original and new data transfer rate.

In the method according to the third advantageous embodiment of the invention, the information processing system is changed in the both transmission directions so that it supports rate $v_5$ as well as rate $v_6$. That way, processed information is produced at a rate which, with the selected rate values, is not higher than $v_6$. Thus only a portion of the transfer capacity of the communications connection is in use and some of the transmission fields allocated to the communications connection are left unused. FIG. 6b illustrates this situation and e.g. in transmission frame 611 the transmission fields 618 and 619, which have been allocated to the connection in question, do not contain information to be transferred. The fields that do not contain information to be transferred but are, however, allocated to the connection in question are marked with diagonal lines in FIG. 6b.

Data transfer rate can be changed without interrupting the information flow over the communications connection. At a certain moment, the unused transmission fields are simply deallocated so that only those transmission fields that contain information to be transferred will be reserved for the connection. This is illustrated in FIG. 6c where the transmission fields left to the connection are coloured black. For example, transmission fields 626 and 627 in transmission frame 612 are used by the communications connection in question. When the data transfer rate has been changed it is possible to apply any information processing method which supports the data transfer rate $v_6$.

Released transmission fields, such as e.g. transmission fields 628 and 629 in transmission fame 621, may be reserved for a new communications connection. These transmission fields reserved for a new communications connection are marked with horizontal lines in FIG. 6c.

If one of the connections shown in FIG. 6c is terminated, the released capacity of the communications link may be reserved for the remaining connection. This involves the same steps as in FIG. 6 but in reverse order. When one of the connections has been terminated, the released capacity is reserved for the other connection (i.e. the transmission fields marked with diagonal lines in FIG. 6b are reserved for that connection to which the black frames belong). After that it is possible to use for this connection an information processing method which produces processed information at a rate not higher than $v_5$ (FIG. 6a).

A base station device according to a fourth advantageous embodiment of the invention may send full rate radio bursts over the air interface while receiving TRAU frames from a mobile network's speech coding unit at base station transmission channel rate of 8 kbps. The difference to a prior-art mobile network base station device is that the prior-art device sends full rate radio bursts only when it is receiving TRAU frames at a channel rate which is 16 kbps or higher.

When using e.g. a method according to the second advantageous embodiment of the invention for branching downlink connections in conjunction with a handover, it is possible to end up in a situation in which only half of the transmission capacity is used on a base station transmission channel the data transfer rate of which is originally defined as 16 kbps. In that case a speech codec is used which is compatible with both 8-kbps and 16-kbps TRAU frames. FIG. 5c illustrates such a situation if there is at point B a base station device according to the fourth advantageous embodiment of the invention which transmits full rate radio bursts over the air interface, and a speech processing unit of a mobile network at point A. At point C there may be a base station device according to the fourth advantageous embodiment of the invention or a prior-art base station device which receives 8-kbps TRAU frames and transmits half rate radio bursts.

Figure 7:
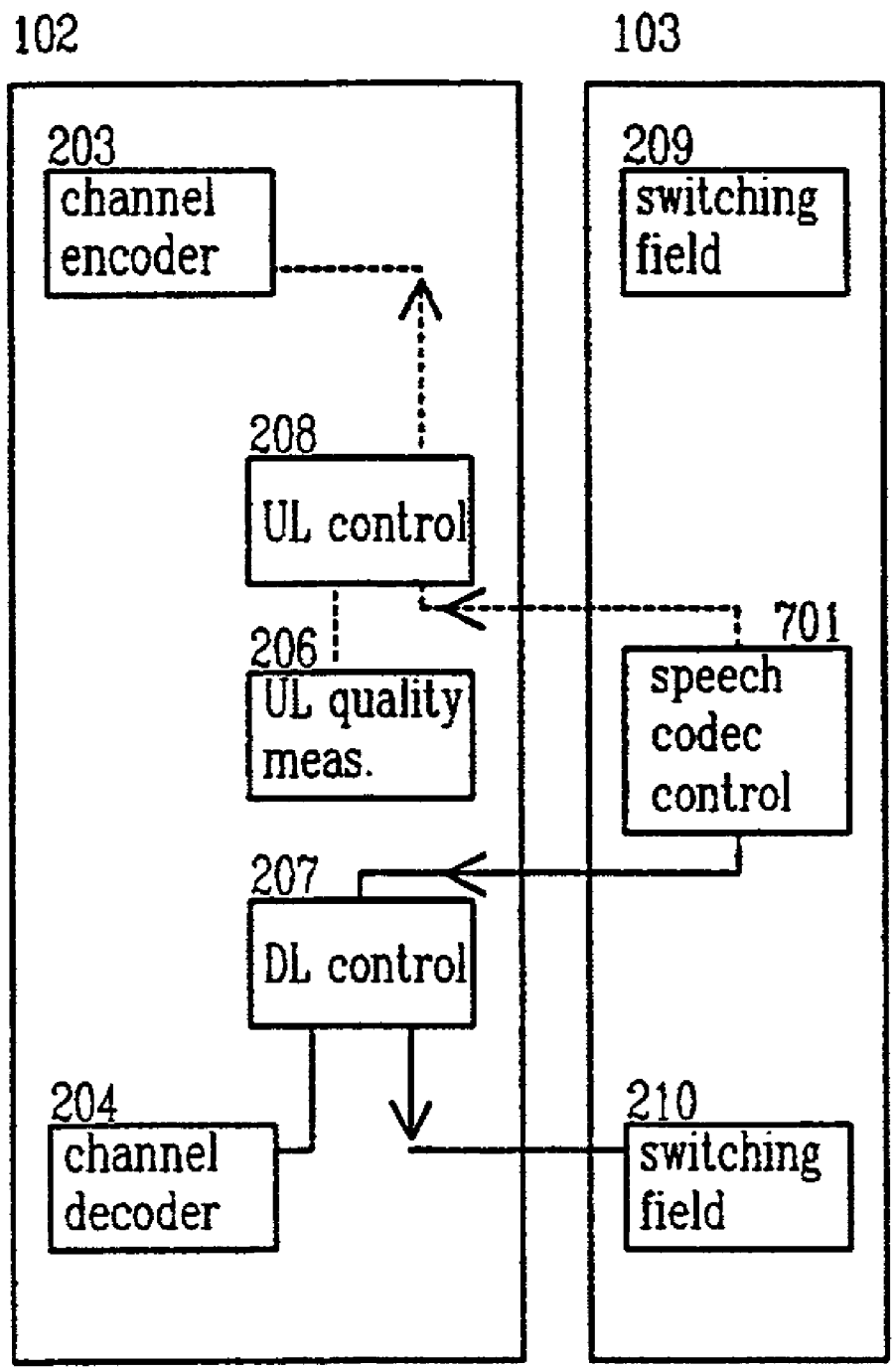
FIG. 7 shows a schematic illustrating a modified AMR system according to a fifth advantageous embodiment of the invention.

FIG. 7 illustrates a change in the AMR system used in mobile networks in accordance with a fifth advantageous embodiment of the invention. According to the AMR system, the mobile network has the highest priority when deciding what speech processing methods to use in certain situations. So, a base station controller or some other mobile network element may decide in conjunction with a handover decision, which speech codecs to use during the handover. AMR system specifies several codec modes for both the half and full rate air interface. Some of the codec modes support both the 8-kbps and 16-kbps base station transmission channel rate, so there are codec modes in the AMR system which are compatible with both the 8-kbps and 16-kbps base station transmission.

FIG. 7 is a schematic representation of a base station controller and base station in the AMR system. A codec mode control block 701 in the base station controller makes the decisions about the speech codecs used and signals the information to the DL control block 207 and UL control block 208 of the original and target base station. The same codec mode control block may select the codec mode so that both the original base station transmission channel rate and the new channel rate in the handover support it. So it is only necessary to add to the AMR system a block which in a handover situation decides on the restrictions in the framework of which the mobile station and the network-side speech processing unit may select the speech codec mode.

An extension according to the fifth advantageous embodiment of the invention to a base station controller or other mobile network element may, if necessary, restrict the speech coding methods used on a downlink connection for a limited time to ones that e.g. in the GSM network support both the 8-kbps and 16-kbps base station transmission. Speech coding methods used on an uplink connection may also be limited similarly, but uplink connections cannot be summed, so this connection has to be switched from a base station to another by means of the switching function.

Channel coding in a mobile network is realized between the mobile station and base station. So, this channel coding is not in any way apparent in that part of the mobile network which is behind the base station, as seen from the mobile station. In a handover, the original base station and target base station may use different channel coding methods. A successful branching does not require that the channel coding methods used be restricted.

After a handover, the mobile station and network-side information coding unit may change the information coding method to any one of those supporting the new base station transmission channel rate. This change, too, may be carried out at the initiative of the codec mode control block 701.

Figure 8A:
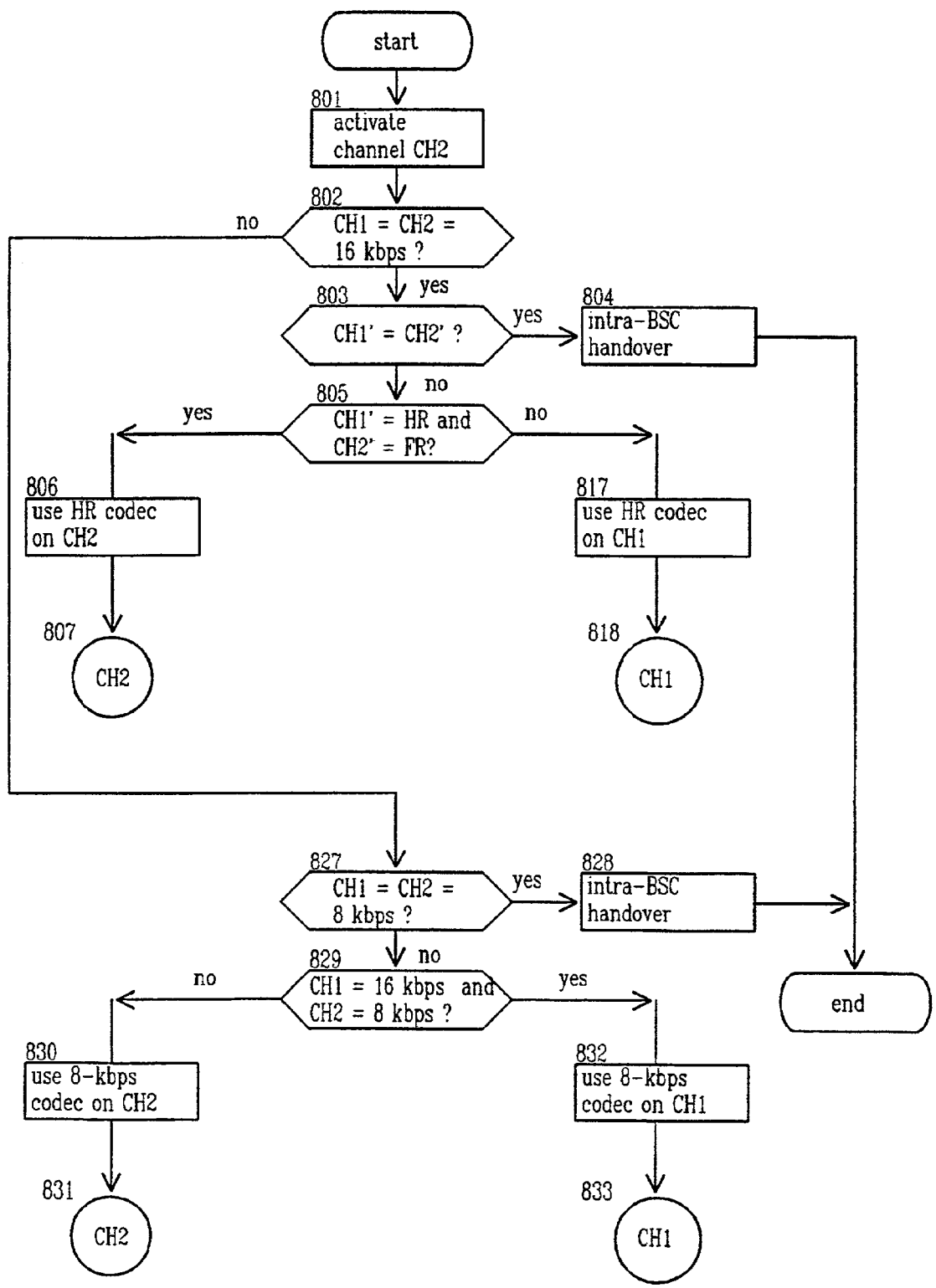
FIG. 8 shows a flow diagram of a handover according to a sixth advantageous embodiment of the invention.
Figure 8B:
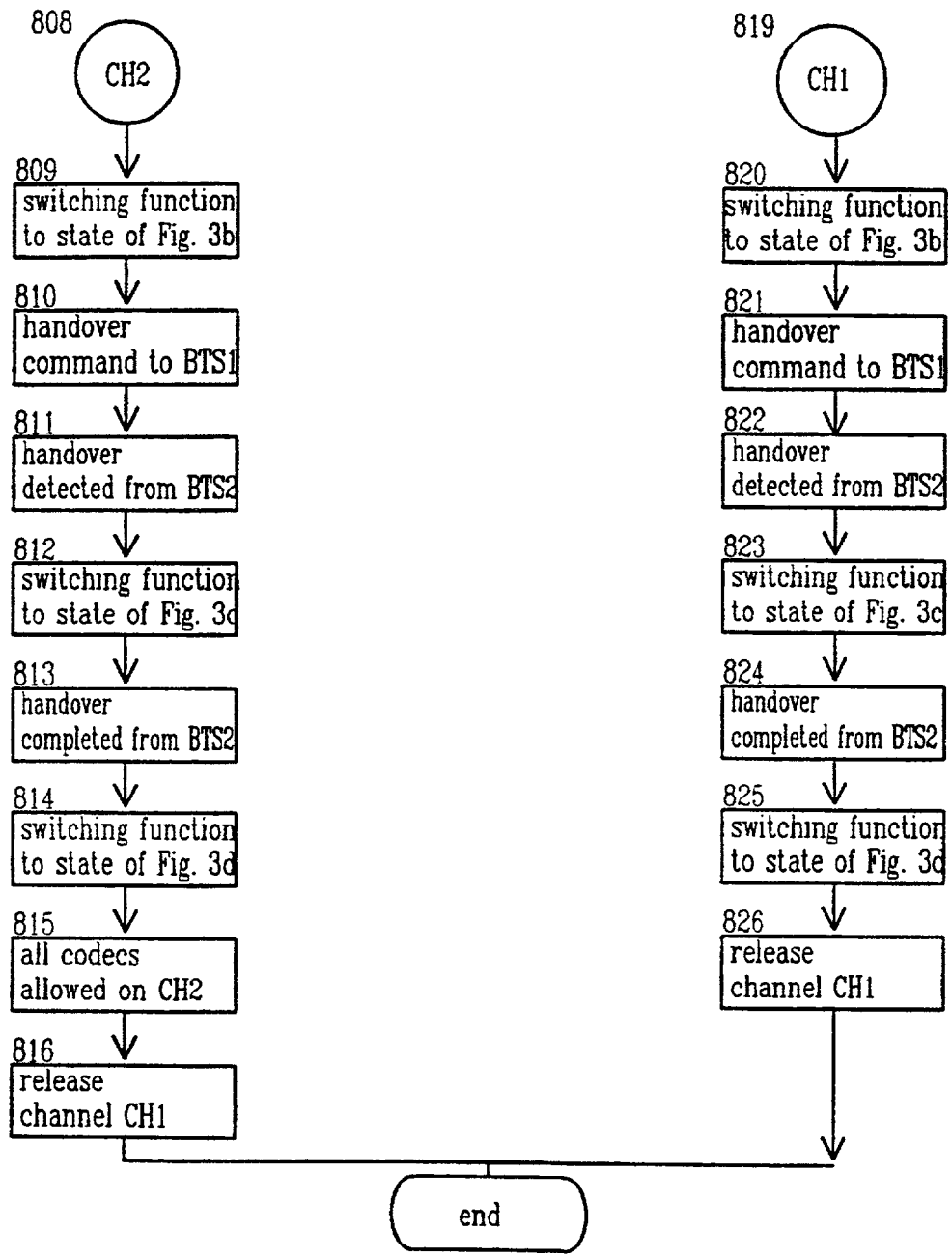

FIG. 8, comprising FIGS. 8*a* and 8*b*, shows a flow diagram of a handover method according to a sixth advantageous embodiment of the invention in a GSM network. The handover method depicted in the flow diagram is applicable to all handovers when the mobile network supports base station transmission channel rates of 8 and 16 kbps as well as half and full rate channels over the air interface. When using conventional speech codecs, some of these handovers would have to be carried out using the switching function. Now it is supposed that an AMR system is used with an extension according to the fifth advantageous embodiment of the invention. This extension decides over handover-related speech codec mode restrictions, and the downlink information stream may be branched in all handovers. The base station, which transmits full rate radio bursts, is in accordance with the fourth advantageous embodiment of the invention.

When using the handover method according to the sixth advantageous embodiment of the invention the downlink information stream may be branched in the base station controller. Prior to the handover in the mobile network, say in the network-side speech coding unit, a processing method is taken into use which is compatible with both base station transmission channel rates, 8 kbps and 16 kbps, and with both air interface channel rates, and the corresponding restoration method is taken into use in the mobile station. The AMR system specifies several speech codec modes of different rates the slowest ones of which produce processed speech at a rate which is lower than 8 kbps. The AMR system has no other restrictions for the codec mode to be used with a certain data transfer rate but that the codec mode has to produce speech at a rate which is lower than the said data transfer rate. The half rate channel rate in the air interface corresponds to a data transfer rate higher than 8 kbps, so 8 kbps is the lowest data transfer rate to be used for the transfer of processed speech. So, at least the slowest speech codec in the AMR system can be used with the half and full rate air interface channel rates as well as with the 8-kbps and 16-kbps base station transmission-channel rates.

A change of the speech coding method (codec mode) can be carried out without breaking the connection. Up to the base station controller the base station transmission channel rate is the original one, and from that point on processed information is transferred to the original channel at the original channel rate and to the target channel at the target channel rate. When the mobile station has been handed over to the target channel the branching at the base station controller can be removed. The handover has been carried out without breaking the connection.

The flow diagram in FIG. 8 makes reference to handover-related signalling messages and the various states of the branching/switching function depicted in FIG. 3. In the flow diagram of FIG. 8 the state transitions and signalling messages of the branching/switching function are shown from the point of view of the base station controller. The state transitions of the branching/switching function may be located differently from what is shown in the flow diagram with respect to the signalling messages. The flow diagram depicts a successful handover. In case of a handover failure the procedure is as specified in GSM recommendations. Base station transmission channel rate on channel CH1 is denoted by v(CH1) and the air interface channel rate on channel CH1 is denoted by v'(CH1) in FIG. 8. Corresponding designations are used for the channel rates of channel CH2.

At first, in step 801 a traffic channel is activated to the target channel CH2 using e.g. a Channel Activation signalling message and the target channel base station acknowledges this with a Channel Activation Acknowledgement signalling message when the new traffic channel has been activated both for the base station air interface and between the base station and base station controller. In step 802 it is examined whether the base station transmission of both the original channel CH1 and target channel CH2 is 16 kbps. If so, and moreover, if in step 803 it is found that the air interface channel rates on channels CH1 and CH2 are the same, then in step 804 an intra-BSC handover is carried out according to the GSM recommendations. If base station transmission on both channels is 8 kbps (step 827) then, too, an intra-BSC handover is possible (step 828). In that case there is no need to check the air interface channel rates since the 8-kbps speech codec used is compatible with them. In other cases than those mentioned above the codec mode selection available during a handover has to be restricted.

If base station transmission is 16 kbps on both channels and the air interface channel rates are different (step 805), the speech codec selection is restricted on the channel on which the air interface channel rate is higher. If the air interface on channel CH2 uses a half rate channel the process moves on to step 818 in which the network-side speech coding unit is forced to use in a downlink connection on channel CH1 a speech codec which produces processed speech at a rate not higher than that corresponding to the half rate air interface channel rate. This can be accomplished e.g. using a Mode Modify message sent by the codec mode control block 701 as internal traffic channel signalling via the DL control block 207 in the base station to the speech encoder 201 in the speech coding unit 105. When the base station of CH1 receives the first TRAU frame in which the speech carried has been encoded using a forced codec and in which the codec used is indicated, the downlink channel encoder 203 in base station 102 is selected according to the speech codec used. It should be noted that the speech codec restriction only applies to the downlink connection. In the uplink connection of CH2 it is possible to use all speech codecs supporting the half rate channel rate, and in the uplink connection of CH1 it is possible to use all codec modes.

From step 818 in the flow diagram the process moves on to step 819 in FIG. 8b. In step 820 the branching/switching function in the switching field 210 of the base station controller is set into the state according to FIG. 3b. Indication of the fact that the speech codecs determined by the base station controller have been taken into use can be sent from the base station to the base station controller either as a signaling message (Mode Modify Acknowledgement) or by waiting for a certain pre-determined length of time. In step 821 a handover command (Handover Command or Assignment Command) is sent from base station 102 of CH1 to the mobile station 101 and the mobile station, having received it, is tuned to channel CH2 of the target base station 104. In step 822 the base station controller receives a message (Handover Detect or Establish Indication) from the target base station which indicates that the mobile station has tuned to channel CH2. At this stage the switching function in the base station controller is set in step 823 into the state according to FIG. 3c, and the uplink connection is routed via the target base station 104. When the handover has been accomplished successfully the mobile station sends via the target base station a Handover Complete or Assignment Complete message (step 824), for example. In step 825 the branching/switching function is set into the final state according to FIG. 3d as there is no longer a need to prepare for the mobile station returning to channel CH1 of the original base station. To complete the handover the base station controller sends to the original base station 102 a command to release the air interface channel and the base station acknowledges this message after it has released the channel.

If the base station transmission on both channels is 16 kbps and channel CH1 uses a half rate air interface and channel CH2 uses a full rate air interface the process ends up in step 806. In this step, the codec modes used in the downlink connection of channel CH2 in the network-side speech coding unit are restricted so that they produce processed speech at a rate not higher than that corresponding to the channel rate of a half rate air interface. Step 807 is followed by step 808 in FIG. 8b.

In step 809 the traffic channel branching/switching function in the base station controller is set into the intermediate state shown in FIG. 3b. In this case it is not necessary for the base station controller to receive information about the fact that the downlink connection of channel CH2 uses half rate codec modes, for channel CH1 is able to use only these modes. Like in the flow diagram branch 817 to 826, in this case, too, the codec mode restriction only applies to the downlink connection. In the uplink connection of CH1 it is possible to use all codec modes supporting the half rate channel rate, and in the uplink connection of CH2 it is possible to use all codec modes.

Activity in steps 810 to 814 corresponds to that in steps 821 to 826 described above. After a successful handover, when the mobile station no longer can return to channel CH1, the branching of the downlink connection can be removed in step 814 and the use of all codec modes is allowed in the downlink connection of the target channel CH2. Thus the process enters normal status in which the codec modes in the both transmission directions are selected on the basis of the air interface quality in accordance with the AMR system. In step 816 the base station controller sends on channel CH1 a radio resource release message and the base station 102 acknowledges the message after having released the channel.

In situations where the base station transmission channel rate of one or both channels is 8 kbps there is no need to check the channel rates used in the air interface. This is because the codec modes that produce processed speech at a rate not higher than 8 kbps are compatible with both half and full rate air interface channels. If the base station transmission channel rate of both channels is 8 kbps an intra-BSC handover is carried out in step 828 as described above.

If the base station transmission channel rate of only one channel is 8 kbps the process ends up in step 829. If channel CH1 uses an 8-kbps base station transmission the codec modes used in the downlink connection of channel CH2 are restricted to those that produce processed speech at a rate not higher than 8 kbps (step 830). The process then moves from step 831 to step 808 in FIG. 8b and the handover is carried out according to steps 809 to 816. If channel CH2 uses an 8-kbps base station transmission the codec modes used in the downlink connection of channel CH1 are restricted to 8-kbps ones (step 832). The process moves from step 833 to step 819 in FIG. 8b and the handover is carried out according to steps 821 to 826.

This handover method according to the sixth advantageous embodiment of the invention also includes two special cases of handover in which the base station transmission channel rate is changed but the air interface channel rate is not changed. Such handovers are possible when AMR speech codecs are used.

Let us first consider a situation in which it is used a half rate channel over the air interface and, consequently, an AMR speech codec producing processed speech at a rate corresponding to the half rate air interface channel rate at the most. When the radio path quality is good the proportion of channel coding in the air interface channel rate can be reduced. Thus it is possible to use an AMR codec mode that requires a channel rate higher than 8 kbps in base station transmission. A handover is then required in which the air interface channel rate is not changed but the base station transmission channel rate increases. This half rate handover in which the base station transmission channel rate on channel CH1 is 8 kbps and on channel CH2 16 kbps is depicted in the flow diagram steps 830 to 831 and 809 to 816.

Correspondingly, if the noise level in the radio interface increases it is possible to increase the proportion of channel coding and change into a codec mode which produces encoded speech at a rate lower than 8 kbps. In that case it is advantageous to carry out a handover in which the air interface channel rate is constant but the base station transmission channel rate decreases. This way the base station transmission capacity is utilized more efficiently. This half rate handover in which the base station transmission channel rate on channel CH1 is 16 kbps and on channel CH2 8 kbps is depicted in the flow diagram steps 832 to 833 and 820 to 826.

Correspondingly, with a full rate air interface in use, it is possible to carry out a full rate handover. This requires that at least one of the AMR codec modes compatible with the full rate air interface is compatible with 8-kbps base station transmission. Compatibility in this context means that the GSM standards allow the use of these codec modes and base station transmission combinations and that these speech codec modes produce encoded information at a rate not higher than the data transfer rate of the compatible base station transmission in question. Such a codec mode compatible with 8-kbps base station transmission is used e.g. when it is desired to save base station transmission and, on the other hand, to guarantee an air interface as free or errors as possible. For example, micro base stations in which it is desired to use ISDN (Integrated Services Digital Network) transmission for base station transmission and which are to be located close to each other, could use a full rate air interface and 8-kbps base station transmission.

Full rate handovers are shown in the same place in the flow diagram as half rate handovers. A full rate handover in which the base station transmission channel rate on channel CH1 is 8 kbps and on channel CH2 16 kbps is presented in the flow diagram steps 830 to 831 and 809 to 816. A full rate handover in which the base station transmission channel rate on channel CH1 is 16 kbps and on channel CH2 8 kbps is depicted in the flow diagram steps 832 to 833 and 820 to 826.

Figure 9:
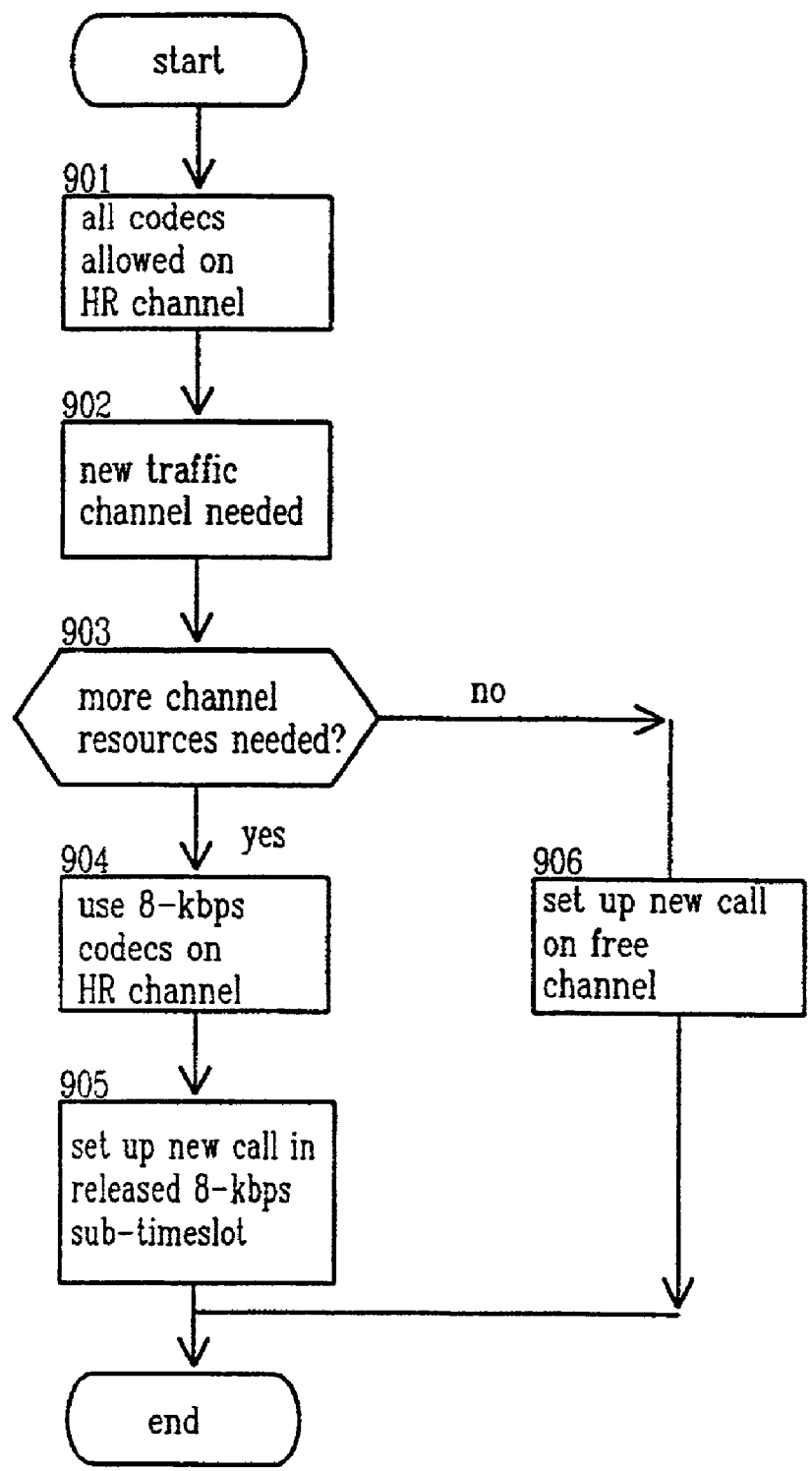
FIG. 9 shows a flow diagram of a method according to a seventh advantageous embodiment of the invention for increasing the number of connections with a certain base station transmission capacity.

FIG. 9 shows a flow diagram of a method according to a seventh advantageous embodiment of the invention for increasing the number of connections with a certain base station transmission capacity. A transceiver unit may carry 16 half rate channels at the most. Usually, one transceiver unit is allocated 2×64 kbps of base station transmission, which can hold eight calls using 16-kbps AMR codecs. Within the framework of the AMR system it is possible to select the codec mode used with the half rate air interface as a codec mode requiring either 8-kbps or 16-kbps base station transmission. This is useful e.g. in a situation where there are eight active connections using a half rate air interface. A transceiver unit could carry more halt rate connections but there is not necessarily enough base station transmission capacity for these connections without reserving another 2×64 kbps band. The reservation of additional capacity can be avoided by making some or all existing connections use 8-kbps codec modes. Thus it is possible to carry through the base station more half rate connections without reserving additional base station transmission capacity.

If the amount of traffic in a base station supporting half rate channels is low, i.e. no more than eight calls per transceiver unit, the base station controller lets the base station and mobile station use all half rate speech codecs in step 901, including codec modes using 16-kbps TRAU frames. Then the speech quality can be optimized according to the radio interference levels.

In step 902 the number of connections is to be increased because of a new call or a handover. In step 903 it is checked whether there are free base station channels and air interface channels available. If there are free channels available the call is established on such a channel in step 906 as either a half rate or full rate call. If there are free half rate channels in the air interface but more resources are required for base station transmission the base station controller 103 restricts in step 904 the speech codecs used by the mobile station 101 in the uplink connection and by the network-side speech coding unit 105 in the downlink connection to speech codecs supporting 8-kbps base station transmission. The base station controller may send the indication of the speech codec restrictions to the base station using e.g. a Mode Modify message, and the speech codec controllers 207 and 208 in the base station convey the information in accordance with FIG. 2 as traffic channel signalling to the mobile station and network-side speech coding unit. Alternatively, the information about the desired speech codecs may be sent from the base station to the mobile station using e.g. an air interface protocol layer 3 Channel Mode Modify message.

When these speech codecs are in use the base station receives, from the network-side speech coding unit, TRAU frames according to the desired speech codecs. Only one of the 8-kbps sub-timeslots reserved for this connection is still in use, and a free pattern, for example, is transmitted to the free 8-kbps sub-timeslot. After that the base station sends to the base station controller a Mode Modify Acknowledgement message. In step 905 the base station controller may establish in the free sub-timeslot a new half rate call which uses speech codecs supporting 8-kbps base station transmission.

With the method illustrated in FIG. 9 it is possible to increase the number of calls routed via a base station dynamically according to the number of calls without it being necessary to reserve in the transmission between the base station and base station controller 4×64-kbps timeslots per transceiver unit for the traffic channels. An additional advantage is that in base stations supporting half and full rate channels it is not necessary to carry out a handover for an existing call from a full rate channel to a half rate channel in order to increase the number of calls. This saves channel resources, for during a handover two channels are active at the same time for a connection. Furthermore, handover-related audio problems also can be avoided. Supposedly at peak hours the radio interface interference levels are high and half rate calls would probably use 8-kbps speech codecs anyway, with which it is possible to use better channel coding. So, forcing calls at peak hours to use 8-kbps speech codecs is near the optimum solution also with respect to the audio quality.

Figure 10:
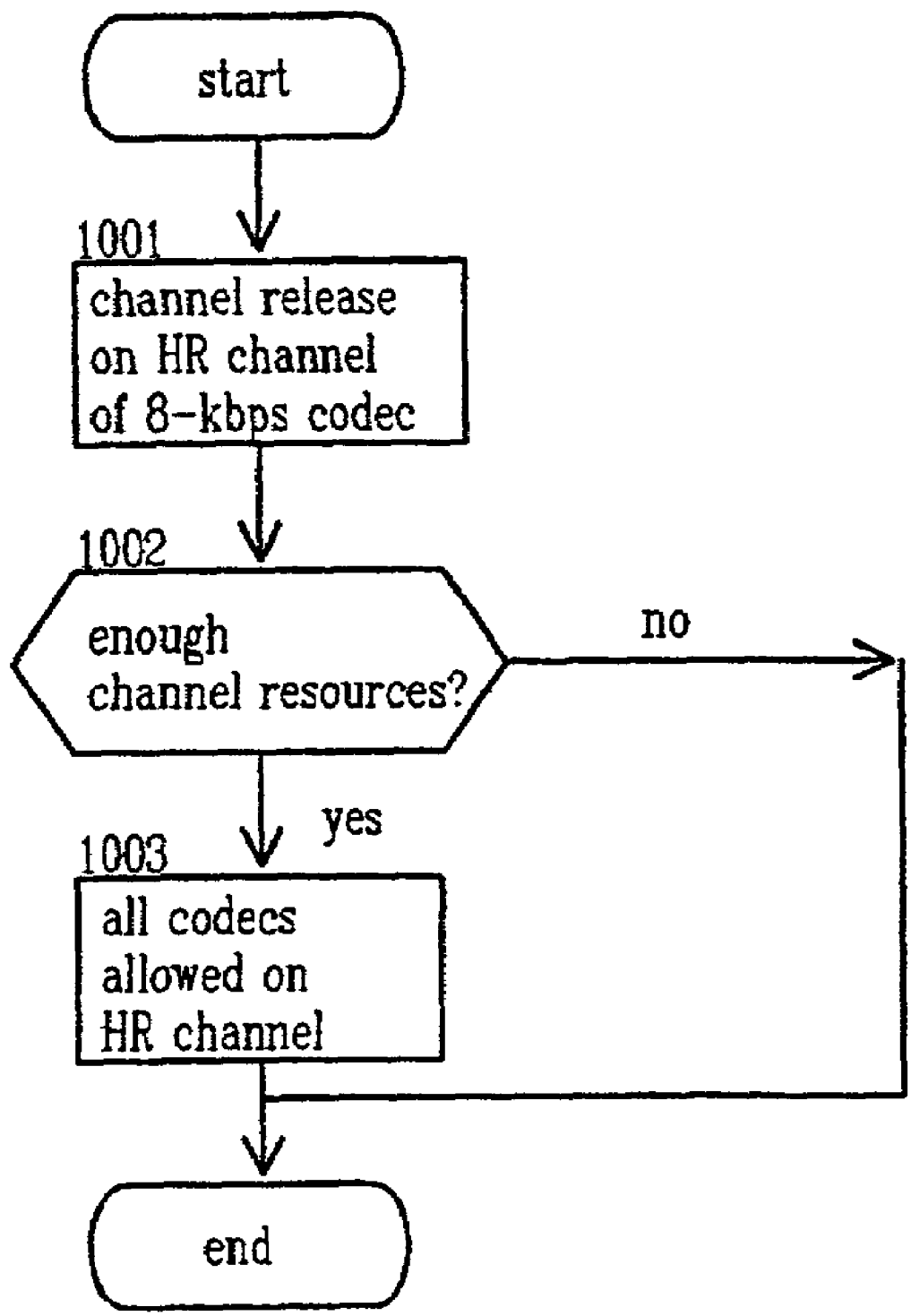
FIG. 10 shows a flow diagram relating to the seventh advantageous embodiment of the invention of freeing up base station transmission capacity.

FIG. 10 shows a flow diagram of the release of transmission capacity of a base station. The base station is either one that supports half rate channels or one that supports both half and full rate channels. In step 1001 the base station controller receives from the base station information about the release of a channel in e.g. a RF Channel Release Acknowledgement message. If the said released channel was using an 8-kbps sub-timeslot in the BTS-BSC transmission and the base station controller estimates that there are enough channel resources, some other half rate call that was using an 8-kbps channel can be allowed to start using all the half rate speech codecs (steps 1002, 1003). In that case this other call may also use the half rate speech codecs that require a 16-kbps channel in base station transmission. This way, the best possible audio quality can be achieved.

The description above used a GSM network and base station transmission rates specified in the GSM recommendations as examples of a mobile communications network. However, methods according to the invention are not limited to these, but the methods according to the invention can be applied to any digital data transfer system, especially digital mobile communications systems such as the UMTS (Universal Mobile Telecommunication System). The said base station transmission channel rates, too, are exemplary. Methods according to the invention can be used in all data transfer systems employing more than one data transfer rate and in which the information transferred is processed using a processing and restoration method.

Speech coding methods in mobile communications networks were above used as examples of an information processing method. However, methods according to the invention are not limited solely to communications connections carrying speech. Methods according to the invention may use either lossless or lossy information processing methods. For example, video image compression methods, in which information may be packed at more than one speed, may be used in methods according to the invention.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for changing a data transfer rate used in a part of a communications connection, comprising the steps of:
    choosing a first processing method from a pre-determined set of processing methods;
    choosing a first restoration method from a pre-determined set of restoration methods;
    processing information using a processing method at a first point of the communications connection;
    transferring the information from the first point to a second point of the communications connection, data transfer rates between the first point and the second point being a first set of data transfer rates;
    restoring the information using said first restoration method at the second point of the communications connection;
    changing at least one data transfer rate used between the first point and the second point, the data transfer rates used after changing the at least one data transfer rate between the first point and the second point being a second set of data transfer rates;
    defining a set of compatible processing methods, each compatible processing method belonging to said pre-determined set of processing methods, having an output information rate that is lower than or equal to a lowest data transfer rate of said first set of data transfer rates and said second set of data transfer rates, and corresponding with a restoration method that belongs to said pre-determined set of restoration methods;
    selecting, prior to changing the at least one data transfer rate, a second processing method from the set of compatible processing methods; and
    replacing the first processing method with the second processing method and processing the information using the second processing method.

2. The method of claim 1, wherein a set of allowed processing methods is defined for each data transfer rate of the first set of data transfer rates and for each data transfer rate of the second set of data transfer rates and the set of compatible processing methods is arranged to include only those processing methods that belong to every set of allowed processing methods.

3. The method of claim 1, further comprising the step of:
    branching said communications connection to travel simultaneously over both the first route and the second route after use of the second processing method;
    wherein a route between the first point and the second point of the communications connection is moved completely or in part from the first route to the second route, the information is transferred on the first route using the first data transfer rates, and the information is transferred on the second route using the second data transfer rates.

4. The method of claim 3, wherein the second processing method is replaced with a third processing method during the branching of the communications connection, the third processing method being selected from the set of compatible processing methods.

5. The method of claim 4, wherein said restoring the information is moved from the second point to a third point of the communications connection and said pre-determined set of restoration methods consists of only restoration methods that are useable at both the second point and the third point.

6. The method of claim 4, wherein the information is transferred via a radio path to a wireless terminal located at the second point, and a radio path part of the first route is different than the radio path part of the second route.

7. The method of claim 6, wherein a data transfer rate of the radio path part of the first route is equal to a data transfer rate of the radio path part of the second route.

8. The method of claim 6, wherein a data transfer rate of the radio path part of the first route differs from the data transfer rate of the radio path part of the second route, and data transfer rates in other parts of the first route are equal to data transfer rates in corresponding parts of the second route, respectively.

9. The method of claim 1, wherein in a part of the communications connection the information is transferred inside transmission frames comprising transmission fields, said part being between the first point and the second point, a data transfer rate in said part is changed from a first value to a second value, and the information is encapsulated in the transmission frames such that some of the transmission fields are empty when the data transfer rate in said part is a maximum of the first value and the second value.

10. The method of claim 1, wherein the information is transferred in a first direction over the communications connection and other information is transferred in a second direction over the communications connection, in the first direction of the communications connection the second processing method is used at the first point and a restoration method corresponding to the second processing method is used at the second point, and a third processing method and a restoration method corresponding to the third processing method are used in the second direction of the communications connection, and wherein the third processing method is selected from the set of compatible processing methods.

11. The method of claim 10, wherein in a part of the communications connection the information is transferred inside transmission frames comprising transmission fields, said part being located between the first point and the second point a data transfer rate in the part is changed from a first value to a second value, and the information is encapsulated in the transmission frames such that some of the transmission fields are empty when the data transfer rate in said part is a maximum of the first value and the second value.

12. The method of claim 9, further comprising the step of:
    allocating the empty transmission fields for use of other communications connections.

13. The method of claim 11, further comprising the step of:
    allocating the empty transmission fields for use of other communications connections.

14. The method of claim 1, wherein the second processing method is a lossless information processing method.

15. The method of claim 14, wherein the second processing method is a data transfer rate limiter.

16. The method of claim 1, wherein the second processing method is a lossy information processing method.

17. The method of claim 16, wherein the second processing method is a speech compression method.

18. The method of claim 16, wherein the second processing method is an image compression method.

19. A system for changing a data transfer rate used in a part of a communications connection, at least one part of said communication connection being a radio path, the system comprising:
- means for determining data transfer rates being used in parts of the certain communications connection, the data transfer rates being used in said parts being a first set of data transfer rates;
- means for determining data transfer rates to be used next in said parts of the communications connection, the data transfer rates to be used next in said parts being a second set of data transfer rates;
- processing means configured to perform information processing in accordance with a processing method that belongs to a pre-determined set of processing methods;
- restoration means configured to perform information restoration in accordance with a restoration method that belongs to a pre-determined set of restoration methods;
- first selection means for selecting a first processing method from the pre-determined set of processing methods in accordance with properties of an air interface associated with the radio path and for selecting a first restoration method that corresponds to the first processing method;
  - conveying means configured to convey information about a processing method that belongs to the pre-determined set of processing methods and information about a restoration method that belongs to the pre-determined restoration methods to communications equipment on a route of the communications connection;
  - means for defining a set of compatible processing methods, each compatible processing method belonging to said pre-determined set of processing methods, having an output information rate that is lower than or equal to the lowest data transfer rate of said first set of data transfer rates and said second set of data transfer rates, and corresponding to a restoration method that belongs to said pre-determined set of restoration methods;
  - second selection means for selecting, prior to a change from the first set of data transfer rates to a second set of data transfer rates, a second processing method from the set of compatible processing methods to be used by said communications equipment and for selecting a second restoration method, the second restoration method corresponding to the second processing method.

20. The system of claim 19, further comprising:
- means for transmitting a command that includes at least one of an order to put the second processing method into use and an order to put the second restoration method into use; and
- means for receiving information at a first data transfer rate and for transmitting said information at a second data transfer rate;
- wherein said means for determining the first set of data transfer rates, said means for determining the second set of data transfer rates, said first selection means and said second selection means, are realized in one network element.

21. The system of claim 20, wherein the network element further comprises:
- means for simultaneously transmitting said information at the second data transfer rate to a first destination and at a third data transfer rate to a second destination.

22. The system of claim 19, further comprising:
- means for receiving a command that includes at least one of an order to put the second processing method into use and an order to put the second restoration method into use;
- wherein said first selection means, said second selection means and a transmitter of said conveying means are realized in a base station device, and said first selection means are configured to perform selections according to radio path quality.

23. The system of claim 22, wherein said base station device further comprises:
- means for receiving information at a first receiving rate
- means for receiving said information at the second receiving rate, the second receiving rate being higher than the first receiving rate;
- means for transmitting said information to a radio path at a first transmission rate; and
- means for transmitting said information to the radio path at a second transmission rate, the second transmission rate being higher than the first transmission rate.

24. The system of claim 23, wherein said base station device is a base station of a global system for mobile communications (GSM) network and the first transmission rate is a half rate radio interface channel rate and the second transmission rate is a full rate radio interface channel rate.

25. The system of claim 23, wherein the base station device is a base station device in an universal mobile telecommunications system (UMTS) network.

* * * * *